United States Patent [19]

Hazan et al.

[11] 3,954,588

[45] May 4, 1976

[54] ELECTROCOATING PROCESS FOR DEPOSITING A CORROSION RETARDANT LAYER ON A METAL SUBSTRATE AND SEQUENTIALLY ELECTROCOATING A CATIONIC FILM-FORMING POLYMER COATING

[75] Inventors: Isidor Hazan, Philadelphia; Robert N. Iacona, Newtown Square; Larry F. Nonemaker, Media, all of Pa.

[73] Assignee: E. I. Du Pont de Nemours and Company, Wilmington, Del.

[22] Filed: Oct. 1, 1974

[21] Appl. No.: 510,987

[52] U.S. Cl. .............................................. 204/181
[51] Int. Cl.² ................... C25D 13/06; C25D 13/18
[58] Field of Search ................................... 204/181

[56] References Cited
UNITED STATES PATENTS 3,497,440  2/1970  Weigel ............................... 204/181
3,882,009  5/1975  Wagener et al. .................... 204/181

Primary Examiner—Howard S. Williams

[57] ABSTRACT

An improved electrocoating process in which a metal substrate is first coated with an anionic layer, for example, anions of an acidic material such as phosphoric acid or chromic acid are used, the anions combine with the metal to form a corrosion retardant layer and then the substrate is electrocoated with a cationic film-forming polymer and dried to form a continuous film.

An aqueous electrocoating composition of an acrylic cationic film-forming polymer reacted with an acid material also is a part of this invention.

6 Claims, No Drawings

3,954,588

ELECTROCOATING PROCESS FOR DEPOSITING A CORROSION RETARDANT LAYER ON A METAL SUBSTRATE AND SEQUENTIALLY ELECTROCOATING A CATIONIC FILM-FORMING POLYMER COATING

BACKGROUND OF THE INVENTION

1. Field of the Invention

This invention is related to an electrocoating process and particularly to an improved electrocoating process that utilizes a novel electrocoating composition containing a cationic film-forming polymer.

2. Description of the Prior Art

Processes for electrocoating anionic carboxylic polymers are known as shown by Gilchrist U.S. Pat. No. 3,230,162, issued Jan. 18, 1966 and Gilchrist U.S. Pat. No. 3,362,899, issued Jan. 9, 1968. Also, processes for electrocoating cationic film-forming polymer are known as shown in Suematsu U.S. Pat. No. 3,755,093, issued Aug. 28, 1973; French Pat. No. 1,477,147, granted Mar. 6, 1967 and French Pat. No. 1,504,895, granted Oct. 30, 1967. But in these processes of electrocoating of anionic carboxylic polymers or cationic polymers, a problem arises in which an excess of neutralization agent accumulates as the polymers are deposited on articles being coated and the excess neutralization must be removed from the process.

An ultrafiltration step has been used to remove excess neutralization agent but this step requires additional equipment and adds to the costs of these processes. In other methods used to avoid the above problem, the cathode or the anode of the electrocoating cell used in these processes is flushed with water or a filtrate from the processes to remove excess neutralization agent but these methods also add to the cost and increase the complexity of the processes. Another technique used to avoid the above problem is to add replenishment compositions to these processes which are deficient in neutralization agent but dispersion of these replenishment compositions can be difficult and can cause problems.

In the novel process of this invention, the neutralization agent is deposited on the metal article being coated and does not need to be removed from the process and forms a corrosion retardant layer on the metal article being coated. Then a film-forming cationic polymer is electrocoated on the article and forms a coating on the article.

SUMMARY OF THE INVENTION

In a conventional cathode electrocoating process, a cationic film-forming polymer composition is deposited on the metal electrode of an electrocoating cell, the electrode consists of a metal article to be coated and is electrically connected to a direct current power source; the electrode is immersed in a bath of an aqueous coating composition containing the cationic film-forming polymer that is at least partially neutralized with an acidic material; the acidic material forms anions in the bath and the film-forming polymer forms cations in the bath; a coating is deposited on the elctrode and the electrode is removed from the bath and dried to form a continuous film thereon;

the improvement that is used with the above process comprises the following:

1. immersing the article in the bath thereby depositing a coating of anions on the surface of the metal article; the anions combine with the surface of the metal article to form a a corrosion retardant layer on the metal article; and sequentially, 2. electrocoating a coating of cationic film-forming polymer onto the metal article to form a uniform film thereon; the metal article is electrically connected to the negative side of the direct current power source and forms an electrode of the electric coating cell.

Another part of this invention is a novel aqueous coating composition used in the above process. This novel aqueous composition has a pH of about 3 to 8 and comprises about 2–50% by weight of film-forming constituents that are uniformly dispersed in an aqueous medium;

the film-forming constituents consist essentially of a synthetic cationic film-forming acrylic polymer having reactive basic groups in which the polymer is at least partially neutralized with an acidic material and the composition is adjusted to said pH with an acidic material which is either phosphoric acid, chromic acid, tannic acid, oxalic acid, nitric acid, nitrous acid, boric acid, ascorbic acid, maleic acid or silicic acid or mixtures of these acids.

DESCRIPTION OF THE INVENTION

In the novel electrocoating process, the metal article to be coated is immersed in a bath of an electrocoating cell. The bath is an aqueous dispersion of about 2–35% by weight of a cationic film-forming polymer at least partially neutralized with an acidic material. The film-forming polymer forms cations in the bath and the acidic material forms anions in the bath.

The metal article is immersed in the bath and a coating of anions is deposited on the surface of the metal article. These anions combine with the metal to form a corrosion retardant finish on the surface of the metal article. The metal article need not be electrically connected to the direct current (D.C.) power source before immersion in the bath. Preferably, the article is connected to the D.C. power source and about 0 to 400 volts are applied across the cell for about 0.01 to 5 minutes and a coating of anions is deposited on the surface of the metal article.

The metal article then is connected to the negative side of the D.C. power source and the article forms the cathode of the cell. A voltage of about 1 to 500 volts is passed through the cell for about 0.01 to 5 minutes and a coating of the cationic polymer is deposited. When the coating reaches the desired thickness, the article is removed from the bath. Preferably, the article is rinsed with water or any filtrate taken from the process to remove excess coating. Then the article is dried at ambient temperatures or baked for about 5–40 minutes at about 100°–300°C. to give a finish coating about 0.1–5 mils thick.

The current density used in the electrocoating cell generally does not exceed 0.3 amperes/in.$^2$ of electrode surface which is immersed in the bath and it is preferable to use less. In the deposition of the anions on the article, voltages of 50 to 200 volts for 0.25 to 2 minutes are preferred to deposit a uniform coating. In the deposition of the cationic film-forming polymer voltage of 5 to 200 volts for 0.25 to 2 minutes are preferred to form a high quality finish.

One advantage of the novel process is that it solves a difficult problem of prior art electrocoating processes of accumulation of neutralization agent in the electrocoating bath used in the process since the neutralization agent which forms anions in the bath is deposited on the article being coated. An ultrafiltration process or flushed electrodes are not required with the novel process to remove neutralization agent nor is discarding of the bath necessary since excess neutralization agent does not accumulate. However, it may be desirable to use an untrafiltration process to remove impurities.

Replenishment of the electrocoating bath in the novel process is readily accomplished by the addition of a composition to the bath that is of about the same constituency of the bath at the beginning of the process. Dispersion of this composition does not present a problem as with the prior art processes which used replenishment compositions which are deficient in neutralization agent.

Another advantage of the novel process is that a corrosion retardant layer is formed on the metal in the electrocoating bath. In prior art processes, compositions which formed a corrosion retardant layer were applied in a separate step to the metal article before the metal article is placed in the electrocoating bath. The novel process of this invention eliminates the above extra coating step.

The aqueous coating composition used in the above process has a total solids content of about 2–50% by weight, and preferably about 8 to 16% by weight. Generally, the composition is pigmented and contains about 0.5–50% by weight of pigment, based on the total solids content of the composition.

The film-forming constituent used in the composition is a cationic film-forming polymer that contains a sufficient number of ionizable cationic groups so that the polymer can be dispersed in an aqueous medium. The polymer is at least partially neutralized with an acidic material and the pH of the composition is adjusted to a pH of about 3–8 with an acidic material.

The above acidic materials that are used also provide a corrosion retardant finish to the metal article being coated by the composition and are either phosphoric acid, chromic acid, tannic acid, oxalic acid, nitric acid, nitrous acid, boric acid, ascorbic acid, maleic acid or silicic acid or mixtures of these acids. Small amounts of other acids can be added with the aforementioned acidic materials.

The following types of film-forming polymers can be used in the composition:

acrylic polymers, epoxy polymers, epoxy ester polymers, polyesters, polyamides, polyimides, alkyd resins, polyurethanes, polyureas, maleinized drying oils, vinyl halide polymers, vinyl acetate polymers and styrene/-butadiene polymers.

Typical examples of cationic groups that can be incorporated into the above polymers are amine groups including primary, secondary, tertiary and quaternary amine groups, ammonium groups, sulfonium groups, oxonium groups and phosphonium groups.

One preferred cationic acrylic polymer used to form a novel composition is of (1) an alkyl methacrylate or styrene or a mixture thereof; (2) an alkyl acrylate, (3) an amino alkyl acrylate or methacrylate and (4) a hydroxy alkyl acrylate or methacrylate. These acrylic polymers form high quality finishes. The following monomers are used to prepare these acrylic polymers: alkyl methacrylates having 1–12 carbon atoms in the alkyl group such as methyl methacrylate, ethyl methacrylate, propyl methacrylate, isopropyl methacrylate, butyl methacrylate, hexyl methacrylate, 2-ethylhexyl methacrylate, nonyl methacrylate, decyl methacrylate, lauryl methacrylate and the like; alkyl acrylates having 2–12 carbon atoms in the alkyl group, such as ethyl acrylate, propyl acrylate, butyl acrylate, hexyl acrylate, 2-ethylhexyl acrylate, nonyl acrylate, decyl acrylate, lauryl acrylate and the like; hydroxy alkyl acrylates or hydroxy alkyl methacrylates having 2–4 carbon atoms in the alkyl groups, such as hydroxyethyl acrylate, hydroxy propyl acrylate, hydroxybutyl acrylate, hydroxy ethyl methacrylate, hydroxy propyl methacrylate, hydroxy butyl methacrylate.

The following monomers can be used with the above acrylic monomers to form polymers useful in the novel composition: styrene, acrylonitrile, acrylamide, methacrylamide, vinyl toluene, butadiene, $\alpha$-methyl styrene and isoprene.

The following monomers are used to provide the cationic group to the acrylic polymer:

aminoalkyl acrylates or methacrylates, such as dimethylaminoethyl methacrylate, diethylaminoethyl methacrylate, dipropylaminoethyl methacrylate, methylethylaminoethyl methacrylate, butylaminoethyl methacrylate, tertiarybutylaminoethyl methacrylate, diethylaminopropyl methacrylate, diethylaminobutyl methacrylate, diethylaminopentyl methacrylate, diethylaminohexyl methacrylate and the like; vinyl pyridine, and oxazoline monomers. Preferred are diethylaminoethyl methacrylate and tertiarybutylaminoethyl methacrylate since these monomers form a high quality composition.

One particularly preferred cationic acrylic polymer of the above type which forms a particularly high quality composition is of 1. 10–63% by weight, based on the weight of the polymer, of methyl methacrylate or styrene or a mixture of methyl methacrylate and styrene;
2. 20–40% by weight, based on the weight of the polymer, of an alkyl acrylate having 2–12 carbon atoms in the alkyl group or an alkyl methacrylate having 4–12 carbon atoms in the alkyl group;
3. 15–40% by weight, based on the weight of the polymer, of a hydroxy alkyl acrylate or a hydroxy alkyl methacrylate having 2–4 carbon atoms in the alkyl groups;
4. 2–15% by weight, based on the weight of the polymer, of an amino alkyl methacrylate or an amino alkyl acrylate.

One particularly useful acrylic polymer of the above type which forms an excellent finish is a polymer of methyl methacrylate, butyl acrylate, 2-hydroxyethyl acrylate and tertiarybutylaminoethyl methacrylate.

These acrylic polymers can be prepared by conventional polymerization techniques such as solution polymerization, bead polymerization, emulsion polymerization and the like. Solution polymerization is preferred since the polymer is readily dispersed in water from the solution. In the solution polymerization, the monomers are charged into a conventional polymerization vessel with a conventional azo type polymerization catalyst and a solvent and reacted at 50° to 120°C. for 1 to 4 hours. The resulting polymer has a Gardner Holdt Viscosity of about A to $Z_6$ measured at 25°C. at 70% polymer solids in ethylene glycol monoethyl ether.

One of the aforementioned acidic materials is blended with the acrylic polymer solution and the solution is then added to an aqueous medium under constant agitation to form an aqueous dispersion. The pH of the composition is then adjusted to a pH of 3–8.

Optionally, a cross-linking agent can be added. The dispersion is then charged into an electrocoating cell and used in the novel process.

Preferably, phosphoric acid or chromic acid are used as the acidic material to neutralize the cationic polymer since these acids form excellent corrosion resistant coatings.

Typical solvents and diluents which are used to prepare the acrylic polymer are, for example, toluene, xylene, butyl acetate, acetone, methylisobutyl ketone, methylethyl ketone, isopropanol, butanol, hexane, ethylene glycol monoethyl ether, ethylene glycol monoethyl ether acetate, V M and P naphtha, mineral spirits and other aliphatic, cycloaliphatic, aromatic hydrocarbons, esters, ethers, ketones and alcohols. Preferably, water miscible solvents are used such as acetone, ethylene glycol monoethyl ether, isopropanol and the like.

Preferably, a water-dispersible cross-linking agent is used in the novel composition. About 95 to 60% by weight, based on the weight of film-forming constituents, of cationic film-forming polymer and 5 to 40% by weight of cross-linking agent are used.

Typical water-dispersible cross-linking agents that can be used in the novel composition are melamine formaldehyde, alkylated melamine formaldehyde resins such as hexakis(methoxymethyl) melamine and partially methylated melamine formaldehyde resins, butylated melamine formaldehyde resins, benzoguanamine formaldehyde resins, methylated urea formaldehyde resins, urea formaldehyde resins, phenol formaldehyde and the like. One particularly useful resin which forms a high quality product is a benzoguanamine formaldehyde resin.

The novel coating composition of this invention can contain pigments. Pigments are added to the composition in the usual manner by forming a mill base or pigment dispersion with the pigment and the aforementioned cationic film-forming polymer or another water-dispersible polymer or a surfactant. This mill base is then blended with the film-forming constituents and the composition is dispersed in water. Typical pigments that can be used are metallic oxides such as titanium dioxide, zinc oxide, iron oxide, and the like, metal hydroxides, metal flakes such as aluminum flake, metal powders, "Afflair" pigments, chromates; such as lead chromates, sulfates, carbonates, carbon black, silica, talc, china clay, aluminum silicate, organic dyes or organic pigments.

The novel coating composition of this invention also can be applied by any of the other conventional methods such as spraying, electrostatic spraying, dipping, brushing, flow coating and the like, and then the coating is baked for about 5–40 minutes at about 125°–250°C. to give coatings about 0.1–5 mils thickness. A coating thickness in an electrocoating process of 0.8 to 1.2 mil is preferred.

The novel composition of this invention is useful as a primer over treated and untreated steel, aluminum and other metals. Conventional acrylic enamels and acrylic dispersion enamels can be applied directly to primer finishes of the novel composition. Acrylic lacquers, acrylic dispersion lacquers, acrylic powder coatings can be applied over the novel composition but a suitable intermediate sealer coat is usually used to improve adhesion of the lacquer or powder topcoat.

The following Example illustrates the invention. Quantities are on a weight basis unless otherwise indicated.

EXAMPLE

An acrylic resin is prepared as follows:

|  | Parts By Weight |
|---|---|
| Portion 1 |  |
| Ethylene glycol monoethylether | 400 |
| Isopropanol | 300 |
| Portion 2 |  |
| Methyl methacrylate monomer | 680 |
| Butyl acrylate monomer | 560 |
| Tertiary Butylaminoethyl methacrylate | 160 |
| 2-Hydroxyethyl acrylate | 600 |
| Azobisisobutyronitrile | 40 |
| Portion 3 |  |
| Azobisisobutyronitrile | 20 |
| Total | 2760 |

Portion 1 is charged into a reaction vessel equipped with a stirrer, reflux condenser, heating mantle, and nitrogen inlet and is heated to its reflux temperature. The reaction mixture is held under nitrogen during the entire reaction. Portion 2 is premixed and added slowly and continuously over a 90 minute period while maintaining the reaction mixture at its reflux temperature. The reaction is continued for an additional 90 minutes and then Portion 3 is added and the reaction mixture is held at its reflux temperature for an additional 60 minutes and then cooled to room temperature.

The resulting polymer solution has a 72% polymer solids content and the polymer is of methyl methacrylate/butyl acrylate/2-hydroxyethyl acrylate/tertiarybutylamino ethyl methacrylate in a weight ratio of 34/28/30/8 and has a Gardner Holdt Viscosity of $Z_5$ measured at 25°C. at 70% polymer solids in ethylene glycol monoethyl ether.

An electrocoating composition is prepared as follows:

|  | Parts By Weight |
|---|---|
| Portion 1 |  |
| Polymer solution (prepared above) | 400.0 |
| Phosphoric acid | 5.0 |
| Benzoguanamine formaldehyde resin solution (85% benzoguanamine formaldehyde resin in ethylene glycol monobutyl ether) | 160.0 |
| Portion 2 |  |
| Deionized water | 2920.0 |
| Total | 3485.0 |

The constituents of Portion 1 are charged into a mixing vessel in the above order and mixed for 15 minutes. Portion 2 is slowly added under constant agitation and when the addition is complete, mixing is continued for an additional 15 minutes. The resulting coating composition has a pH of 3.5 and a conductivity of 465 micromhos.

The above coating composition is charged into a stainless steel tank for electrodeposition. A cold roll steel panel is positioned in the center of the tank and is electrically connected to the positive side of a direct current (D.C.) power source and forms the anode. The second steel panel is positioned in the tank and is connected to the negative side of the D.C. power source and is the cathode. A direct current of 3 volts is applied for 2 minutes and then a current of 40 volts is applied for 4 minutes. A phosphatizing coating of phosphoric acid anions are deposited on the panel forming the anode. The electrical connections are reversed, i.e., the cold roll steel panel is connected to the negative side of the D.C. power source and the second panel is connected to the positive side of the D.C. power source. A direct current is applied as above and the cationic polymer film of about 1 mils thick is deposited on the phosphatizing coating. The panel is dried and then baked for 30 minutes at 175°C.

A second panel is prepared as above, except the panel is of galvanized steel. A second set of panels is prepared of cold roll steel and of galvanized steel, except the phosphatizing coating is omitted.

The above panels then are exposed to a salt spray test for 500 hours. Before the panels are exposed, an X is scribed through the coating to the metal on each panel and the distance the coating flakes away from the scribed mark is measured at the end of the exposure and is as follows:

|  | Distance (Inches) |
|---|---|
| . Steel panel coated with phosphatizing coating and polymer film | ⅜–½ |
| . Steel panel coated with polymer film | ⅞ |
| . Galvanized steel panel coated with phosphatizing coating and polymer film | ⅜–½ |
| . Galvanized steel panel coated with polymer film | ⅞ |

The above test shows that the panels having the phosphatizing coating in combination with the polymer film have superior salt spray corrosion resistance to the panels coated only with the polymer film but did not have the phosphatizing coating.

What is claimed is:

1. In the process for electrocoating a cationic film-forming polymer composition on a metal electrode of an electrocoating cell, said electrode consisting of a metal article and being electrically connected to a direct current power source, by immersing said electrode in a bath of an aqueous coating composition comprising a synthetic cationic film-forming polymer composition which is at least partially neutralized with an acidic material which forms anions in said bath, electrocoating a coating on the electrode, removing the electrode from the bath and drying the electrode to form a continuous film thereon, the improvement used therewith comprises:
   1. immersing the metal article in the bath which is connected to the positive side of the direct current source thereby providing the article with a positive polarity and electrocoating a coating of anions on the surface of the metal article; the anions combine with the surface of the metal article to form a corrosion retardant layer on the metal; and
   2. changing the polarity of the metal article by switching to the negative side of the direct current source thereby providing the article with a negative polarity and electrocoating a coating of the cationic film-forming polymer onto the metal article to form a uniform film thereon;

wherein the aqueous coating composition has a pH of about 3 to 8 and comprises 5–50% of film-forming constituents uniformly dispersed in an aqueous medium; wherein the film-forming constituents consist essentially of
   a cationic film-forming polymer of
   1. an alkyl methacrylate or styrene or a mixture thereof;
   2. an alkyl acrylate;
   3. an amino alkyl methacrylate or an amino alkyl acrylate; and
   4. a hydroxy alkyl acrylate or a hydroxy alkyl methacrylate;
   and a water-dispersible cross-linking agent;
and contains sufficient phosphoric acid or chromic acid to provide said pH.

2. The process of Claim 1 in which the coating of (1) is electrocoated using a voltage of up to 400 volts for about 0.01 to 5 minutes and in which the coating of (2) is electrocoated using a voltage of about 1 to 500 volts for about 0.01 to 5 minutes.

3. The process of Claim 1 in which the aqueous coating composition contains pigment.

4. A metal substrate prepared according to the process of Claim 1 having a corrosion retardant layer on the metal article and a 0.1–5 mil thick dried coalesced layer of the film-forming constituents in adherence to the corrosion retardant layer.

5. The process of claim 1 in which the film-forming constituents consist essentially of
   A. 95 to 60% by weight, based on the weight of the film-forming constituents, of an acrylic polymer of
   1. 10–63% by weight, based on the weight of the polymer, methyl methacrylate or styrene or a mixture of methyl methacrylate and styrene;
   2. 20–40% by weight, based on the weight of the polymer, of an alkyl acrylate, having 2–12 carbon atoms in the alkyl group or an alkyl methacrylate having 4–12 carbon atoms in the alkyl group;
   3. 15–40% by weight, based on the weight of the polymer, of a hydroxy alkyl acrylate or a hydroxy alkyl methacrylate, having 2–4 carbon atoms in the alkyl groups;
   4. 2–15% by weight, based on the weight of the polymer, of an amino alkyl methacrylate or an amino alkyl acrylate; and
   B. 5 to 40% by weight, based on the weight of the film-forming constituents, of an alkylated melamine formaldehyde resin or a benzoguanamine formaldehyde resin.

6. The process of Claim 5 in which the acrylic polymer is a polymer of methyl methacrylate, butyl acrylate, tertiary butylaminoethyl methacrylate and 2-hydroxyethyl acrylate and the cross-linking agent is benzoguanamine formaldehyde.

\* \* \* \* \*